United States Patent [19]

Morishige et al.

[11] Patent Number: 4,564,402

[45] Date of Patent: Jan. 14, 1986

[54] METHOD FOR PREVENTING DISBONDING OF WELD-CLADDING

[75] Inventors: Norio Morishige, Yokosuka; Ryoichi Kume, Yokohama, both of Japan

[73] Assignee: Ishikawajima-Harima Jukogyo Kabushiki Kaisha, Tokyo, Japan

[21] Appl. No.: 642,789

[22] Filed: Aug. 21, 1984

[30] Foreign Application Priority Data

Aug. 25, 1983 [JP] Japan ................................ 58-155449

[51] Int. Cl.$^4$ ............................................... C21D 1/78
[52] U.S. Cl. ..................................... 148/127; 208/154
[58] Field of Search ................ 148/127, 134, 143, 16, 148/14, 12 E, 38; 428/683, 685; 208/154, 209, 210; 219/76.12

[56] References Cited

U.S. PATENT DOCUMENTS 4,224,360 9/1980 Ohnishi et al. ...................... 428/685

FOREIGN PATENT DOCUMENTS 41025 11/1974 Japan ..................................... 148/14
39129 3/1982 Japan ................................... 148/143

Primary Examiner—Peter K. Skiff

[57] ABSTRACT

Disclosed is a method for preventing hydrogen-induced disbonding of austenitic stainless steel cladding, which is made on a low alloy steel, in a reactor vessel which has been used in a high-temperature and high-pressure hydrogen atmosphere. The clad steel is cooled from its operating temperature to a temperature which is not lower than 100° C. Then, the clad steel is maintained at a temperature between said temperature which is not lower than 100° C. and a postweld heat treatment so as to effect hydrogen degassing treatment. Thereafter, the clad steel is further cooled.

3 Claims, 3 Drawing Figures

METHOD FOR PREVENTING DISBONDING OF WELD-CLADDING

BACKGROUND OF THE INVENTION

The present invention relates to a method for preventing hydrogen-induced disbonding of austenitic stainless steel cladding in a reactor vessel which has been used in a high-temperature and high-pressure hydrogen atmosphere.

In a chemical pressure vessels used in a high-temperature and high-pressure hydrogen atmosphere, such as a desulfurization reactor vessel in a petroleum refinery which is subjected to a temperature between 400° and 500° C. and a hydrogen partial pressure of 200 kgf/cm$^2$, in order to increase the resistance against corrosion, austenitic stainless steel is laid over the inner surfaces of a shell of a low alloy steel by welding. However, when the operation is stopped and the temperature of reactor vessel is dropped to room temperature, it is very frequently observed that cracks are developed along the boundaries beween the weld-cladding and the base metal. Such cracks are considered to be a kind of delayed cracks due to hydrogen (to be referred to as "hydrogen-induced disbonding of cladding" in this specification). That is, when the reactor vessel is cooled to room temperature, the disbonding of weld-cladding occurs owing to hydrogen which has been penetrating into the weld metal through the surface of the weld-cladding during the operation of the reactor vessel. Therefore, there have been proposed various methods for preventing the disbounding.

One method for preventing the disbonding is to control the cooling condition. That is, the operation temperature is gradually dropped to room temperature. Alternatively, during the cooling step, the reactor vessel is maintained at temperatures above 350° C. so that hydrogen may be sufficiently degassed and then the reactor vessel is air-cooled to room temperature.

However, it is not necessarily possible to gradually cool chemical equipment. For instance in the case of emergency, the operation is shut down by spraying the nitrogen gas or water to the chemical equipment so as to quickly cool it. In this case, there is no time for degassing the hydrogen by gradually cooling the chemical equipment or by maintaining it at temperatures above 350° C. As a result, there is no countermeasure to prevent the disbonding. Thus, in the case of emergency shutdown, the disbonding cannot be prevented at all.

The inventors made extensive studies and experiments on hydrogen-induced disbonding of cladding and found out that crackings are not related to a cooling rate from an operating temperature in a high-temperature and high-pressure hydrogen atmosphere until the temperature is dropped to 100° C. and that no crackings occur at temperatures above 100° C. and crackings develop at temperatures less than 100° C.

In view of the above, the primary object of the present invention is to provide a method for preventing hydrogen-induced disbonding of cladding, which can be employed even in the case of an emergency shutdown.

The above and other objects, effects, features and advantages of the present invention will become more apparent from the following description of a preferred embodiment thereof taken in conjunction with the accompanying drawings.

DETAILED DESCRIPTION OF THE PREFERRED EMBODIMENT

Hydrogen-induced disbonding of cladding occurs in a certain time period after the temperature of the reactor vessel has dropped to room temperature and therefore are a kind of delayed cracks due to hydrogen which penetrates into base metal through weld-cladding at high operating temperature. Therefore it has been considered that heating for degassing hydrogen at a certain temperature during cooling is effective for avoiding the disbonding. Therefore, so far a gradual cooling method or a method for maintaining at a predetermined temperature so as to degas hydrogen has been used. However, in the case of an emergency shutdown, a chemical equipment such as a reactor vessel is quickly cooled from an operating temperature between 400° and 500° C. so that it is next to impossible to maintain the temperature of the vessel equipment at temperatures above 350° C.

The inventors conducted hydrogen charging tests using clad specimens. In these tests, the specimens were cooled rapidly from the hydrogen charging temperature to room temperature as is the case with an emergency shutdown in actual pressure vessel, and the relationship between hydrogen degassing heating conditions and the disbonding was investigated.

Weld-claddings were made on 2¼ Cr-1 Mo steel plate using ASTM Type 309 L strip electrode for 1st layer and Type 347 strip electrode for 2nd layer. After overlay-welding, the clad plate was post-weld-heat-treated at 705±15° C. for 25.5 hr. Then, the clad specimens with a cross section of 55×55 mm and a length of 110 mm were cut out from the weld-clad steel.

Figure 1:
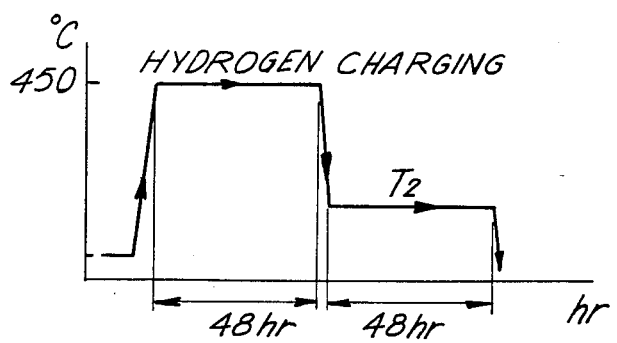
FIG. 1 is a graph illustrating the relationship between temperature and time in experiments conducted for determining the minimum temperature at which cracking does not occur during a predetermined time period.

As shown in FIG. 1, the test piece is left at 450° C. for 48 hours in an atmosphere in which the hydrogen partial pressure is 200 kgf/cm$^2$ so that hydrogen is absorbed into the test piece. Thereafter the test piece is air-cooled and maintained at a predetermined temperature T$_2$ for 48 hours. Next, whether the disbonding has occurred or not is detected using ultrasonic testing. Typical results are shown in TABLE 1.

TABLE 1

| Holding Temperature T$_2$ (°C.) | 75 | 100 | 125 | 150 | 200 |
|---|---|---|---|---|---|
| Cracks | exist | no | no | no | no |

From TABLE 1 it is seen that no cracks occur when the temperature is maintained above 100° C. during air cooling. That is, no cracks will occur when cooling is stopped at temperatures above 100° C.

Figure 2:
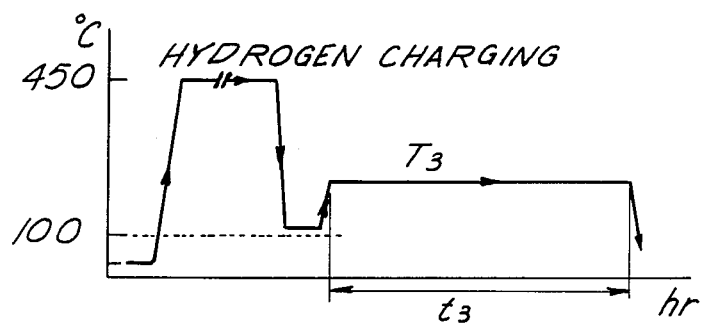
FIG. 2 is a schematic illustration of the temperature and time relationship in hydrogen charging tests carried out for investigating the relationship between hydrogen degassing heating (T$_3$, t$_3$) and cracking susceptibility.
Figure 3:
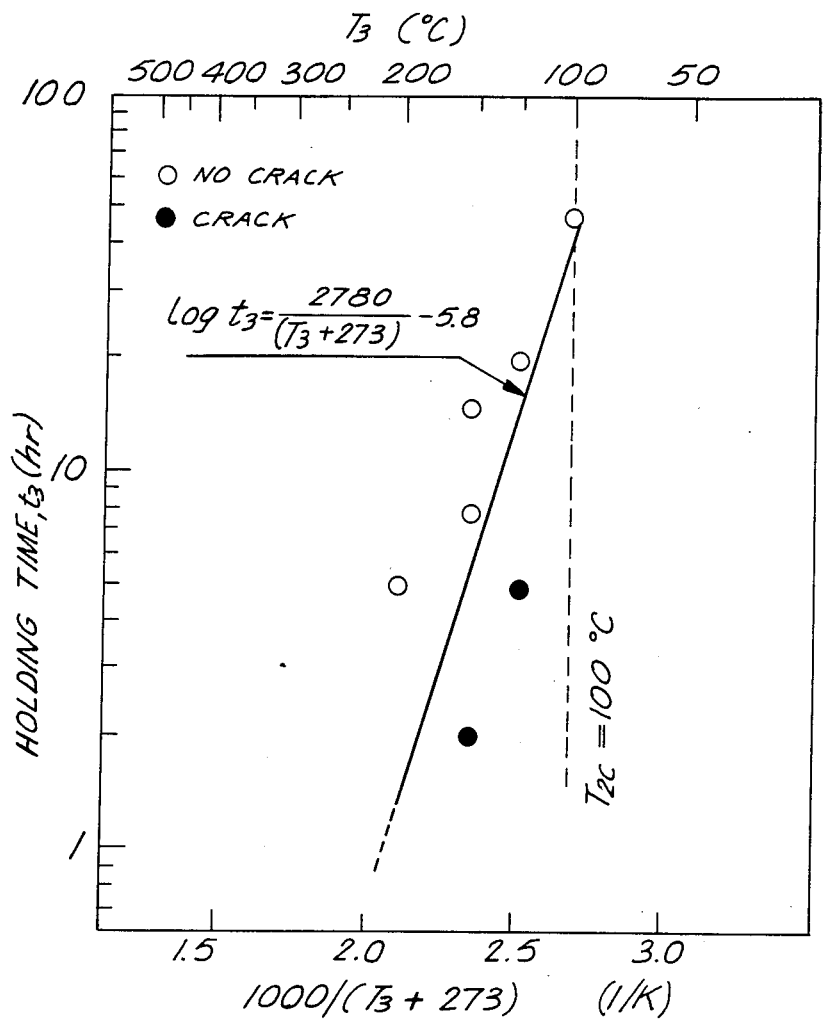
FIG. 3 shows a typical relationship between hydrogen degassing heating (T$_3$, t$_3$) and cracking susceptibility.

Next, the test piece, which has absorbed hydrogen in the manner described above with reference to FIG. 1, is air-cooled to a temperature immediately above 100° C.

and then heated at $T_3$ for $t_3$ hours so as to degas hydrogen as shown in FIG. 2. Thereafter the test piece is air-cooled and checked whether or not it has cracks. The test results are shown in FIG. 3 illustrating the relationship between the reciprocal of the absolute temperature corresponding to the heating temperature $T_3$ (°C.) on the one side and holding time $t_3$ on the other side. FIG. 3 shows a logarithmic equation for obtaining a holding time $t_3$ during which the test piece is held at a temperature $T_3$. When the test piece is held at a temperature $T_3$ for a time longer than that represented by this straight line and then air-cooled, cracks due to hydrogen can be prevented.

According to the experiments conducted by the inventors, the lower limit of holding temperature $T_3$ at which no cracks will occur is 100° C. in the case of a weld-cladding of austenitic stainless steel. The upper limit may be considered to be 720° C. used in post-weld heat treatment. It is not preferable to raise the temperature above 720° C. because the structure changes. From FIG. 3 it is seen that a temperature at which the cooling step is stopped is between 150° and 120° C. on the assumption that the hydrogen discharge heating time is 10-20 hours. In other words, even when the test piece is quickly cooled to a temperature just above 100° C., cracks can be prevented providing that the test piece is then heated and maintained to a predetermined temperature range such as 150°-120° C. for a predetermined time period such as 10-20 hours. Even in the case of an emergency shutdown, it is possible to carry out the hydrogen degassing heating at the above-described temperature range.

In the case of pressure vessels involving high-temperature, high-pressure hydrogen, austenitic stainless steel weld overlays incur righ hydrogen after prolonged service in high-temperature, high-pressure hydrogen gas. The resulting disbonding can be prevented if suitable hydrogen degassing heating is applied to the weld overlay subsequently without lowering the temperature to below 100° C., even when reactor vessel is air-cooled not gradually from operating temperature.

The air cooling rate of the test pieces with a low heat capacity may be considered to correspond to water cooling in practice so that the method of the present invention can be applied industrially regardless of a cooling rate. The method of the present invention can be employed even in the case of an emergency shutdown so that the disbonding can be prevented. As a result, the present invention is very advantageous in practice when re-inspection and repair costs of chemical equipment are taken into consideration.

What is claimed is:

1. A method for preventing, during cooling to room temperature, hydrogen-induced exfoliation of austenitic stainless steel from a cladding of said stainless steel welded to the inside of a steel reaction vessel, after exposure to a reaction under high temperature and high pressure hydrogen atmosphere, comprising subjecting a reaction vessel having an austenitic stainless steel cladding which would exfoliate if cooled directly to room temperature, to cooling to an initial temperature of not lower than 100° C., maintaining said vessel at such temperature for a time sufficient to expel hydrogen from said steel, and thereafter further cooling said vessel.

2. A method according to claim 1, wherein said vessel is cooled to an initial temperature of from about 100° C. to 720° C.

3. A method according to claim 1, wherein said vessel is cooled to an initial temperature of from about 120° C. to 150° C.

* * * * *